US006527971B1

(12) United States Patent
Nakamura et al.

(10) Patent No.: US 6,527,971 B1
(45) Date of Patent: Mar. 4, 2003

(54) RARE-EARTH BONDED MAGNET, RARE-EARTH BONDED MAGNET COMPOSITION, AND METHOD OF MANUFACTURING THE RARE-EARTH BONDED MAGNET

(75) Inventors: Yoshiki Nakamura, Yamagata-mura (JP); Koji Akioka, Matsumoto (JP)

(73) Assignee: Seiko Epson Corporation (JP)

( * ) Notice: Subject to any disclaimer, the term of this patent is extended or adjusted under 35 U.S.C. 154(b) by 16 days.

(21) Appl. No.: 09/762,308

(22) Filed: Feb. 1, 2001

(30) Foreign Application Priority Data

Jun. 2, 1999 (JP) .......................................... 11-155230

(51) Int. Cl.$^7$ .......................... H01F 1/08; C08L 44/00; C08K 3/10

(52) U.S. Cl. ................................ 252/62.54; 252/62.55

(58) Field of Search ........................... 252/62.54, 62.55

(56) References Cited

U.S. PATENT DOCUMENTS 4,626,371 A 12/1986 Ikenaga et al. .......... 252/62.54
5,932,134 A * 8/1999 Christ et al. ................ 148/104
5,958,283 A * 9/1999 Schmid et al. ........... 252/62.54

FOREIGN PATENT DOCUMENTS

JP 09-283314 * 10/1997

OTHER PUBLICATIONS

European Search Report, EP Application No. 00935539.7–2119–JP0003622.

* cited by examiner

*Primary Examiner*—C. Melissa Koslow
(74) *Attorney, Agent, or Firm*—Harness, Dickey & Pierce, P.L.C.

(57) ABSTRACT

In a rare-earth bonded magnet of the invention, magnetic powder containing a rare-earth element is bonded together by a binding resin. The rare-earth bonded magnet may further contain an antioxidant and a lubricant. The binding resin contains a high molecular compound comprising the following structure unit;

—X—R—X—Y—Ar—Y—

(where X is a functional group containing a nitrogen atom, Y is a functional group containing a carbonyl group, R is a normal-chain or branched alkylene group having a carbon number of 6–16, and Ar is an aromatic ring residue).

14 Claims, No Drawings

RARE-EARTH BONDED MAGNET, RARE-EARTH BONDED MAGNET COMPOSITION, AND METHOD OF MANUFACTURING THE RARE-EARTH BONDED MAGNET

TECHNICAL FIELD

The present invention relates to a rare-earth bonded magnet, a rare-earth bonded magnet composition, and a method of manufacturing the rare-earth bonded magnet.

BACKGROUND ART

A rare-earth bonded magnet is manufactured by molding under pressure a mixture (compound) of rare-earth magnetic powder and a binding resin (organic binder) into a desired magnet shape. For molding rare-earth bonded magnets, a compaction molding method, an injection molding method, and an extrusion molding method are utilized.

According to the compaction molding method, a magnet is manufactured by filling the compound in a pressing mold, compressing it to form a molding, and then heating the molding for hardening when the binding resin is a thermosetting resin. This method is advantageous in increasing the amount of the magnetic powder in the manufactured magnet and improving magnetic characteristics thereof because the magnet can be molded with a smaller amount of the binding resin than required in the other methods.

According to the extrusion molding method, a magnet is manufactured by extruding the compound, which has been heated into a molten state, through a die of an extruder, hardening an extrusion under cooling, and then cutting it into a desired length. This method is advantageous in being flexibly adapted for various shapes of magnets and enabling even thin or long magnets to be easily manufactured. To ensure the fluidity of the molten compound in the molding step, however, the amount of the added binding resin must be increased in comparison with that required in the compaction molding method. Therefore, the amount of the magnetic powder in the manufactured magnet is reduced and magnetic characteristics thereof are apt to deteriorate.

According to the injection molding method, the compound is heated into a molten state having sufficient fluidity, and the molten compound is poured into a mold for molding into a predetermined magnet shape. This method is advantageous in being more flexibly adapted for various shapes of magnets than the extrusion molding method and, in particular, enabling even magnets having different shapes to be easily manufactured. However, because the molten compound is required to have a higher level of fluidity in the molding step than the extrusion molding method, the amount of the added binding resin must be further increased in comparison with that required in the extrusion molding method. Therefore, the amount of the magnetic powder in the manufactured magnet is further reduced and magnetic characteristics thereof are apt to further deteriorate.

The binding resin for use in rare-earth bonded magnets is mainly divided into a thermoplastic resin and a thermosetting resin. Of these resins, the thermoplastic resin is superior because it is more advantageous in suppressing an increase of porosity and ensuring a high mechanical strength. Typical examples of the thermoplastic resin, which have hitherto been employed as the binding resin, are polyphenylene sulfides (PPS) and polyamides.

However, polyphenylene sulfides cannot be said as having good wettability with the rare-earth magnetic powder, and are inferior in moldability. Accordingly, if the polyphenylene sulfides are employed as the binding resin, the content of the binding resin in the compound must be increased. This leads to a difficulty in increasing the content of the rare-earth magnetic powder, i.e., in obtaining higher magnetic characteristics.

Furthermore, polyphenylene sulfides have the higher melting points and, in addition, have lower crystallizing rates than polyamides. This results in the necessity of raising the molding temperature and the necessity of prolonging the cooling time after the molding. In other words, the compound is necessarily subjected to a high-temperature environment for a longer time. During the manufacture of rare-earth bonded magnets, therefore, the rare-earth magnetic powder in the compound is likely to deteriorate due to oxidation, etc.

For those reasons, there is a limitation in obtaining rare-earth bonded magnets having superior magnetic characteristics when polyphenylene sulfides are employed as the binding resin.

Moreover, because polyphenylene sulfides have lower crystallizing rates than polyamides, a longer time is required until the rare-earth bonded magnets are hardened after the molding. Consequently, the cycle time is long and the production efficiency of the rare-earth bonded magnets is poor.

On the other hand, as the polyamides, polyamide 6 and polyamide 66 have been employed for the reason of easier availability.

However, polyamide 6 and polyamide 66 are inferior in stability of dimensions and shape. Stated otherwise, rare-earth bonded magnets using the polyamide 6 and the polyamide 66 as the binding resin are susceptible to changes in dimensions, shape, etc. during use for a long period. Accordingly, there is a limitation in using polyamides for magnets having applications in precision devices.

To overcome the above drawback, a rare-earth bonded magnet using polyamide 12 as the binding resin has been developed.

Because of having the lower melting point and softening temperature, however, such a rare-earth bonded magnet is inferior in heat resistance and hence has a difficulty in being employed under a high-temperature environment. Also, when such a rare-earth bonded magnet is used in a device generating heat such as a motor, there is a risk that the rare-earth bonded magnet may deform during a long period of use due to the heat generated from the device.

An object of the present invention is to provide a rare-earth bonded magnet which is superior in magnetic characteristics, shape stability and heat resistance, a rare-earth bonded magnet composition from which the rare-earth bonded magnet can be obtained, and a method of manufacturing the rare-earth bonded magnet.

DISCLOSURE OF THE INVENTION

The above object is achieved with the present invention set forth in the following (1) to (16)

(1) A rare-earth bonded magnet in which magnetic powder containing a rare-earth element is bonded together by a binding resin, wherein the binding resin contains a high molecular compound comprising the following structure unit;

$$-(X-R-X-Y-Ar-Y)-$$

(where X is a functional group containing a nitrogen atom, Y is a functional group containing a carbonyl group, R is a normal-chain or branched alkylene group having a carbon number of 6–16, and Ar is an aromatic ring residue).

(2) A rare-earth bonded magnet in which magnetic powder containing a rare-earth element is bonded together by a binding resin, wherein the binding resin contains a high molecular compound comprising the following structure unit;

$$-\!(X—R—X—Y—Ar—Y)\!-$$

(where X is a functional group containing a nitrogen atom, Y is a functional group containing a carbonyl group, R is a normal-chain or branched alkylene group having a carbon number of 9–16, and Ar is an aromatic ring residue).

(3) Preferably, the high molecular compound includes two or more kinds of the structure unit.

(4) Preferably, the melting point of the binding resin is 260–370° C.

(5) Preferably, the content of the magnetic powder is 77–99.5 wt %.

(6) In any one of the above (1) to (5), preferably, porosity is not more than 5 vol %.

(7) In any one of the above (1) to (6), preferably, the magnetic energy product $(BH)_{max}$ resulted when the bonded magnet is molded under no magnetic field is not less than 2 MGOe.

(8) In any one of the above (1) to (6), preferably, the magnetic energy product $(BH)_{max}$ resulted when the bonded magnet is molded under a magnetic field is not less than 10 MGOe.

(9) A rare-earth bonded magnet composition comprising magnetic powder containing a rare-earth element, and a binding resin, wherein the binding resin contains a high molecular compound comprising the following structure unit;

$$-\!(X—R—X—Y—Ar—Y)\!-$$

(where X is a functional group containing a nitrogen atom, Y is a functional group containing a carbonyl group, R is a normal-chain or branched alkylene group having a carbon number of 6–16, and Ar is an aromatic ring residue).

(10) A rare-earth bonded magnet composition comprising magnetic powder containing a rare-earth element, and a binding resin, wherein the binding resin contains a high molecular compound comprising the following structure unit;

$$-\!(X—R—X—Y—Ar—Y)\!-$$

(where X is a functional group containing a nitrogen atom, Y is a functional group containing a carbonyl group, R is a normal-chain or branched alkylene group having a carbon number of 9–16, and Ar is an aromatic ring residue).

(11) Preferably, the high molecular compound in the rare-earth bonded magnet composition includes two or more kinds of the structure unit.

(12) Preferably, the melting point of the binding resin in the rare-earth bonded magnet composition is 260–370° C.

(13) Preferably, the content of the magnetic powder in the rare-earth bonded magnet composition is 77–99.5 wt %.

(14) Preferably, the rare-earth bonded magnet composition further comprises an antioxidant and/or a lubricant.

(15) A method of manufacturing a rare-earth bonded magnet, the method comprising the steps of kneading a rare-earth bonded magnet composition according to any one of the above (9) to (14) at a temperature at which a binding resin in the composition is at least softened or molten, thereby obtaining a kneaded mixture; and molding the kneaded mixture into a magnet shape.

(16) In the method of manufacturing the rare-earth bonded magnet according to the above (15), preferably, the kneaded mixture is molded by hot molding.

BEST MODE FOR CARRYING OUT THE INVENTION

The present invention will be described below in detail.

A description is first made of a rare-earth bonded magnet of the present invention.

In the rare-earth bonded magnet of the present invention, magnetic powder containing a rare-earth element (rare-earth magnetic powder) is bonded together by a binding resin. The rare-earth bonded magnet of the present invention may further contain an antioxidant, a lubricant, etc.

1. Rare-earth Magnetic Powder

The rare-earth magnetic powder is preferably made of an alloy containing a rare-earth element and a transition metal. Especially, the following alloys [1]–[4] are preferable.

[1] An alloy containing, as basic components, a rare-earth element, primarily Sm, and a transition metal, primarily Co (hereinafter referred to as an Sm—Co based alloy).

[2] An alloy containing, as basic components, R (R is at least one of rare-earth elements containing Y), a transition metal, primarily Fe, and B (hereinafter referred to as an R—Fe—B based alloy).

[3] An alloy containing, as basic components, a rare-earth element, primarily Sm, a transition metal, primarily Fe, and an interstitial element, primarily N (hereinafter referred to as an Sm—Fe—N based alloy).

[4] An alloy prepared by mixing at least two of the compositions of the above [1]–[3]. In this case, the advantages of several kinds of mixed magnetic a powder can be developed in a combined manner and better magnetic characteristics can be easily obtained.

Typical examples of the Sm—Co based alloy include $SmCo_5$, $(Sm_{0.42}Pr_{0.58})Co_5$, $Sm(Co_{0.76}Fe_{0.10}Cu_{0.14})_7$, and $Sm_2(Co, Cu, Fe, M)_{17}$ (M=Ti, Zr, Hf).

Typical examples of the R—Fe—B based alloy include an Nd—Fe—B based alloy, a Pr—Fe—B based alloy, an Nd—Pr—Fe—B based alloy, alloys prepared by replacing part of the rare-earth elements in the above alloys with a heavy rare-earth element such as Dy or Tb, and alloys prepared by replacing part of Fe in the above alloys with another transition element such as Co or Ni. Those alloys are also usable by pulverizing the same with hydrogen and then dehydrogenating the resulting powder. Further, those alloys may be in the form of the so-called nano-composite magnetic powder having a nano-composite texture in which a soft magnetic phase and a hard magnetic phase are present in adjacent relation.

A typical example of the Sm—Fe—N based alloy is $Sm_2Fe_{17}N_3$ prepared by nitriding an $Sm_2Fe_{17}$ alloy.

Examples of the rare-earth element contained in the magnetic powder are Y, La, Ce, Pr, Nd, Sm, Eu, Gd, Tb, Dy, Ho, Er, Tm, Yb and Lu. Examples of the rare earth mixed in the magnetic powder are mish metal and didymos. The magnetic powder may contain one or more of those rare-earth elements and mixed rare earth. Examples of the transition metal include Fe, Co, Ni, Cu, V, Ti, Zr, Mo and Hf. The magnetic powder may contain one or more of those transition metals. Additionally, for the purpose of improving the magnetic characteristics, the magnetic powder may contain Al, C, Ga, Si, Ag, Au, Pt, Zn, Sn or the like as needed.

The average particle size of the magnetic powder is not particularly limited, but it is preferably about 0.5–500 μm, more preferably about 1–100 μm. Further, to obtain good moldability, a high density and high magnetic performance with a small amount of the binding resin as described later, it is preferable that the particle size distribution of the magnetic powder be broad to some extent. Such a particle size distribution also contributes to reducing the porosity of the resulting bonded magnet. Additionally, in the case of above [4], the average particle sizes of the several kinds of mixed magnet power may differ for each component of the mixed magnet power.

The method of manufacturing the magnetic powder is not particularly limited. For example, the magnetic powder can be obtained by a method of fabricating an alloy ingot through melting and casting steps, and then pulverizing (and classifying if necessary) the alloy ingot into an appropriate size, or a method of fabricating rapidly-cooled ribbon-shaped thin strips (clusters of fine polycrystals) with a rapid-cooling thin strip manufacturing apparatus that is used in manufacture of an amorphous alloy, and then pulverizing and classifying the thin strips into an appropriate particle size.

The content of the magnetic powder in the magnet has a preferable range depending on the method used for molding the magnet.

More specifically, for the rare-earth bonded magnet manufactured by compaction molding, for example, the content of the rare-earth magnetic powder is preferably about 95–99.5 wt %, more preferably about 96–99 wt %. If the content of the magnetic powder were too small, the magnetic characteristics (especially the magnetic energy product) would not be improved. Conversely, if the content of the magnetic powder is too large, the content of the binding resin would be reduced relatively, thus resulting in reduction of moldability and mechanical strength.

For the rare-earth bonded magnet manufactured by extrusion molding, for example, the content of the rare-earth magnetic powder is preferably about 94–98.5 wt %, more preferably about 95–98 wt %. If the content of the magnetic powder were too small, the magnetic characteristics (especially the magnetic energy product) would not be improved. Conversely, if the content of the magnetic powder is too large, the content of the binding resin would be reduced relatively and the fluidity in the extruding step would be lowered, thus resulting in difficulty and incapability of the molding.

For the rare-earth bonded magnet manufactured by injection molding, for example, the content of the rare-earth magnetic powder is preferably about 77–97.5 wt %, more preferably about 93–97 wt %. If the content of the magnetic powder were too small, the magnetic characteristics (especially the magnetic energy product) would not be improved. Conversely, if the content of the magnetic powder is too large, the content of the binding resin would be reduced relatively and the fluidity in the injecting step would be lowered, thus resulting in difficulty and incapability of the molding.

2. Binding Resin (Binder)

The binding resin (binder) contains a high molecular compound comprising the following structure unit;

$$\text{-(}X\text{—}R\text{—}X\text{—}Y\text{—}Ar\text{—}Y\text{)-}$$

(where X is a functional group containing a nitrogen atom, Y is a functional group containing a carbonyl group, R is a normal-chain or branched alkylene group having a carbon number of 6–16, and Ar is an aromatic ring residue).

As a result of conducting intensive studies on an optimum binding resin for the rare-earth bonded magnet, the inventor has reached the high molecular compound comprising the above-mentioned structure unit (hereinafter referred to as "the present high molecular compound"). In other words, from the studies made by the inventor, it was found that the present high molecular compound has the following superior properties when used as the binding resin for the rare-earth bonded magnet.

(1) Superior Wettability with Rare-earth Magnetic Powder

The present high molecular compound has superior wettability with the rare-earth magnetic powder and has superior adhesion with the rare-earth magnetic powder. In the case of employing the present high molecular compound as the binding resin, therefore, kneading of the rare-earth magnet composition and molding of the rare-earth bonded magnet can be performed with a smaller amount of the binding resin.

Accordingly, by employing the present high molecular compound as the binding resin, the content of the rare-earth magnetic powder in the rare-earth bonded magnet can be increased, and hence a rare-earth bonded magnet having higher magnetic characteristics can be obtained.

(2) Superior Shape Stability

The rare-earth bonded magnet employing the present high molecular compound has superior shape stability. The rare-earth bonded magnet employing the present high molecular compound is therefore less susceptible to changes in dimensions, shape, etc. even when used for a long period.

Accordingly, the rare-earth bonded magnet using the present high molecular compound can be satisfactorily used not only in ordinary applications, but also in devices and parts (e.g., precision parts) which are required to have high reliability in dimensions, shape, etc.

(3) Superior Heat Resistance

The rare-earth bonded magnet employing the present high molecular compound has superior heat resistance. The rare-earth bonded magnet employing the present high molecular compound is therefore less susceptible to deformation even when used for a long period under a high-temperature environment.

Accordingly, the rare-earth bonded magnet employing the present high molecular compound can be satisfactorily used not only in ordinary applications, but also in devices and parts which are used under a high-temperature environment, as well as devices and parts (e.g., a high-torque, high-output motor) which generate heat and are brought into a high-temperature condition.

(4) High Mechanical Strength

The rare-earth bonded magnet employing the present high molecular compound has a high mechanical strength. The rare-earth bonded magnet employing the present high molecular compound is therefore less susceptible to cracks, damages, etc.

Accordingly, the rare-earth bonded magnet employing the present high molecular compound can be satisfactorily used not only under an ordinary use environment, but also under an environment subjected to vibration, impact, etc.

(5) Fast Crystallizing Rate

The present high molecular compound has a relatively fast crystallizing rate. The rare-earth bonded magnet employing the present high molecular compound can be therefore cooled at a rapid cooling rate after the molding.

It is known that magnetic characteristics of the rare-earth magnetic powder deteriorate due to oxidation, etc. caused at a high temperature in the molding step. For this reason, the molded rare-earth bonded magnet is preferably rapidly cooled after the molding. By employing the present high molecular compound as the binding resin, therefore, the molded rare-earth bonded magnet can be rapidly cooled and a rare-earth bonded magnet having superior magnetic characteristics can be obtained.

Also, since the present high molecular compound has a fast crystallizing rate, the rare-earth bonded magnet employing the present high molecular compound can be hardened in a shorter time after the molding. In other words, the rare-earth bonded magnet employing the present high molecular compound can be released from the mold in a shorter time after the molding, and the cycle time of the molding process is shortened. Accordingly, the efficiency in manufacturing the rare-earth bonded magnet is very high.

The most advantageous point of the present high molecular compound is that the present high molecular compound has the above various superior properties concurrently.

Thus, by employing the present high molecular compound as the binding resin, a very excellent rare-earth bonded magnet having the above-mentioned properties can be obtained.

The present high molecular compound expressed below will be described in more detail;

$$-\!\!\!(X—R—X—Y—Ar—Y)\!\!\!-$$

(where X is a functional group containing a nitrogen atom, Y is a functional group containing a carbonyl group, R is a normal-chain or branched alkylene group having a carbon number of 6–16, and Ar is an aromatic ring residue).

Examples of the functional group containing a nitrogen atom include an NH group, an NR' group (where R' is an alkyl groups such as a methyl group), an NHPh group (where Ph is a phenylene group such as an o-phenylene group or m-phenylene group), and so on.

Examples of the functional group containing a carbonyl group includes a CO group, an R"CO group (where R" is an alkylene group such as a methylene group), an NHCO group, and so on.

The inventor discovered that a high molecular compound having those functional groups exhibits very superior properties as described above.

Examples of the normal-chain or branched alkylene group having the carbon number of 6–16 include $(CH_2)_6$, $(CH_2)_7$, $(CH_2)_8$, $(CH_2)_9$, $(CH_2)_{10}$, $(CH_2)_{11}$, $(CH_2)_{12}$, $(CH_2)_2CHCH_3(CH_2)_2$, $CH_2C(CH_3)_2CH_2CHCH_3(CH_2)_2$, $CH_2CHCH_3(CH_2)_2CHCH_3CH_2$, $CH_2CHCH_3(CH_2)_6$, $CH_2CHCH_3(CH_2)_3CHCH_3CH_2$, and so on.

A high molecular compound having such an alkylene group is particularly superior in wettability with the rare-earth magnetic powder, shape stability, heat resistance, and mechanical strength.

Above all, the carbon number of the normal-chain or branched alkylene group is more preferably in the range of 9–16. A high molecular compound having such an alkylene group has very superior moldability and is more superior in wettability with the rare-earth magnetic powder, shape stability, and mechanical strength.

Examples of the normal-chain or branched alkylene group having the carbon number of 9–16 include $(CH_2)_9$, $(CH_2)_{10}$, $(CH_2)_{11}$, $(CH_2)_{12}$, $CH_2C(CH_3)_2CH_2CHCH_3(CH_2)_2$, $CH_2CHCH_3(CH_2)_6$, $CH_2CHCH_3(CH_2)_3CHCH_3CH_2$, and so on.

Examples of the aromatic ring residue include a phenylene group such as an o-phenylene group, m-henylene group or p-phenylene group, a naphthylene group such as a 1,4-naphthylene group, a 4,4'-methylenediphenyl group, derivatives thereof, and so on.

With a high molecular compound having such an aromatic ring residue, the shape stability, heat resistance and mechanical strength of the rare-earth bonded magnet are improved.

The present high molecular compound may comprise one kind of the above-mentioned structure unit, but may also contain two or more kinds of the above-mentioned structure unit.

By preparing the present high molecular compound containing two or more kinds of the above-mentioned structure unit, a rare-earth bonded magnet being especially superior in certain characteristics can be obtained.

Examples of the present high molecular compound containing two or more kinds of the above-mentioned structure unit include a copolymer comprising two or more kinds of the above-mentioned structure unit, a polymer blend or polymer alloy of two or more kinds of high molecular compounds each comprising the above-mentioned structure unit, and so on.

The melting point of the binding resin is not particularly limited, but it is preferably about 260–370° C. When the melting point is not lower than this lower limit value, a rare-earth bonded magnet having superior heat resistance can be obtained. However, if the melting point exceeds that upper limit value, molding of the rare-earth bonded magnet would be difficult to implement.

In the above temperature range, the melting point of the binding resin is more preferably about 270–330° C. When the melting point is not lower than this lower limit value, the heat resistance of the resulting rare-earth bonded magnet is further improved. Also, when the melting point is not higher than that upper limit value, the rare-earth bonded magnet can be more easily molded.

In addition to the above-described present high molecular compound, the binding resin may further contain another high molecular compound, a low molecular compound, etc.

From the viewpoint of providing the above-mentioned advantages more noticeably, the binding resin preferably contains not less than 50 wt % of the present high molecular compound, more preferably not less than 65 wt %, still more preferably not less than 80 wt %.

3. Antioxidant

The antioxidant is an additive that is added to the rare-earth bonded magnet composition in the manufacturing process thereof, described later, to prevent oxidation, deterioration and denaturation of the rare-earth magnetic powder itself, as well as oxidation, deterioration and denaturation of the binding resin which are caused upon the rare-earth magnetic powder functioning as a catalyst. Addition of the antioxidant contributes to preventing oxidation of the rare-earth magnetic powder, improving the magnetic characteristics of the magnet, and improving thermal stability of the rare-earth bonded magnet composition in the kneading and molding steps.

Since the antioxidant is evaporated or denatured during the intermediate steps, such as kneading and molding, in manufacture of the rare-earth bonded magnet composition, part of the antioxidant remains in the manufactured rare-earth bonded magnet. Accordingly, the content of the antioxidant in the rare-earth bonded magnet is, for example, about 10–95%, in particular 20–90%, with respect to the amount of the antioxidant added to the rare-earth bonded magnet composition.

The antioxidant may be of any type so long as it can prevent or suppress oxidation of the rare-earth magnetic powder, etc. For example, tocopherol, amine based compounds, amino acid based compounds, nitro carboxylates, hydrazine compounds, cyan compounds, and a chelating agent coordinated to a metal ion, particularly an Fe component, of a sulfide to produce a chelate compound are preferably employed as the antioxidant. Above all, hydrazine compounds are especially preferable.

It is a matter of course that the type, composition, etc. of the antioxidant are not limited to the examples listed above.

4. Lubricant

The lubricant functions to improve the fluidity of materials in the kneading and molding steps of the rare-earth bonded magnet. By adding the lubricant, therefore, a load imposed on a motor in the kneading step can be reduced, and a higher density can be provided under a lower molding pressure in the molding step. Thus, addition of the lubricant contributes to cutting down the cost and prolonging the service life of a kneader and a molding machine.

Since the lubricant is evaporated or denatured during the intermediate steps, such as kneading and molding, in manufacture of the rare-earth bonded magnet composition, part of the lubricant remains in the manufactured rare-earth bonded magnet. Accordingly, the content of the lubricant in the rare-earth bonded magnet is, for example, about 10–90%, in particular 20–80%, with respect to the amount of the lubricant added to the rare-earth bonded magnet composition.

Examples of the lubricant include stearic acid and metal salts thereof, fatty acids, silicone oil, various waxes, graphite, molybdenum disulfide, and so on. Among these example, stearic acid and metal salts thereof are preferable because of being especially superior in lubricating action. Examples of stearates include zinc stearate, calcium stearate, and so on.

In the rare-earth bonded magnet of the present invention, the porosity (volume proportion of pores contained in the bonded magnet) is preferably not more than 5 vol %, more preferably not more than 3.5 vol %, still more preferably not more than 2.0 vol %. If the porosity is too high, there is a risk that the mechanical characteristics, corrosion resistance and solvent resistance of the magnet may deteriorate depending on such conditions as the composition of the magnetic powder and the composition and content of the binding resin, and the magnetic characteristics may deteriorate depending on the use conditions.

The rare-earth bonded magnet of the present invention exhibits superior magnetic characteristics, even when manufactured as an isotropic magnet, because of the above-described features such as the composition of the magnetic powder and the larger content of the magnetic powder.

More specifically, for the rare-earth bonded magnet of the present invention manufactured by compaction molding, for example, the magnetic energy product $(BH)_{max}$ is preferably not smaller than 4 MGOe, more preferably not smaller than 7 MGOe, when molded under no magnetic field. When molded under a magnetic field, the magnetic energy product $(BH)_{max}$ is preferably not smaller than 10 MGOe, more preferably not smaller than 12 MGOe.

For the rare-earth bonded magnet of the present invention manufactured by extrusion molding, for example, the magnetic energy product $(BH)_{max}$ is preferably not smaller than 4 MGOe, more preferably not smaller than 7 MGOe, when molded under no magnetic field. When molded under a magnetic field, the magnetic energy product $(BH)_{max}$ is preferably not smaller than 10 MGOe, more preferably not smaller than 12 MGOe.

For the rare-earth bonded magnet of the present invention manufactured by injection molding, for example, the magnetic energy product $(BH)_{max}$ is preferably not smaller than 2 MGOe, more preferably not smaller than 6 MGOe, when molded under no magnetic field. When molded under a magnetic field, the magnetic energy product $(BH)_{max}$ is preferably not smaller than 10 MGOe, more preferably not smaller than 12 MGOe.

Incidentally, the shape, dimensions, etc. of the rare-earth bonded magnet of the present invention is not particularly limited. Regarding the shape, the rare-earth bonded magnet may have any suitable shape such as a column, prism, cylinder (ring), arc, flat plate, and curved plate. Also, the rare-earth bonded magnet may have any suitable dimensions ranging from a large size to an ultra-small size.

Next, the rare-earth bonded magnet composition of the present invention will be described.

The rare-earth bonded magnet composition of the present invention primarily contains the above-described rare-earth magnetic powder and the above-described binding resin. The rare-earth bonded magnet composition of the present invention may further contain the above-described antioxidant, lubricant, etc., as needed.

The amount of the rare-earth magnetic powder added to the rare-earth bonded magnet composition is determined in consideration of the magnetic characteristics of the resulting rare-earth bonded magnet, the fluidity of the molten composition in the molding step.

More specifically, for the rare-earth bonded magnet composition subjected to compaction molding, for example, the content of the rare-earth magnetic powder in the rare-earth bonded magnet composition is preferably about 94–99 wt %, more preferably about 95–99 wt %. If the content of the rare-earth magnetic powder is too small, the magnetic characteristics (especially the magnetic energy product) would not be improved. Conversely, if the content of the magnetic powder is too large, the performance in both kneading and molding would be deteriorated, thus resulting in a molding failure and, in extreme cases, difficulty and incapability of the molding.

For the rare-earth bonded magnet composition subjected to extrusion molding, for example, the content of the rare-earth magnetic powder in the rare-earth bonded magnet composition is preferably about 93–98.5 wt %, more preferably about 94–98 wt %. If the content of the magnetic powder is too small, the magnetic characteristics (especially the magnetic energy product) would not be improved. Conversely, if the content of the magnetic powder is too large, the content of the binding resin would be reduced relatively and the fluidity in the extruding step would be lowered, thus resulting in difficulty and incapability of the molding.

For the rare-earth bonded magnet composition subjected to injection molding, for example, the content of the rare-earth magnetic powder in the rare-earth bonded magnet composition is preferably about 77–97.5 wt %, more preferably about 93–97 wt %. If the content of the magnetic powder is too small, the magnetic characteristics (especially the magnetic energy product) would not be improved. Conversely, if the content of the magnetic powder is too large, the content of the binding resin would be reduced relatively and the fluidity in the injecting step would be lowered, thus resulting in difficulty and incapability of the molding.

When an antioxidant is added to the rare-earth bonded magnet composition, the content of the antioxidant (the amount of the antioxidant added to the composition) is preferably about 0.1–2.0 wt %, more preferably about 0.3–1.8 wt %. In this case, the content of the antioxidant is preferably about 5–120%, more preferably about 15–90 wt %, with respect to the amount of the binding resin.

If the content of the antioxidant is too small, the effect of preventing oxidation would be insufficient, and oxidation of the magnetic powder, etc. could not be sufficiently suppressed, for example, when the content of the magnetic powder is large. Conversely, if the content of the antioxidant is too large, the content of the binding resin would be reduced relatively and the mechanical strength of the resulting molding would tend to lower.

When a lubricant is added to the rare-earth bonded magnet composition, the content of the lubricant (the amount of the lubricant added to the composition) is preferably about 0.01–0.7 wt %, more preferably about 0.02–0.5 wt %. If the content of the lubricant is too small, the lubricating action would not be sufficiently developed, and if the content of the lubricant is too large, the mechanical strength of the resulting molding would be reduced.

As a matter of course, in the present invention, the amounts of the added antioxidant and lubricant may be lower than the lower limits or higher than the upper limits of the above-mentioned ranges, or the antioxidant and the lubricant may not be added.

Further, the rare-earth bonded magnet composition may be added with other various additives such as a molding aid and a stabilizer.

The rare-earth bonded magnet composition of the present invention is in the form of a mixture of the above-described rare-earth magnetic powder and binding resin, as well as the above-described antioxidant and lubricant which are added as needed, or in the form resulted from kneading the mixture (i.e., a kneaded mixture, described later).

The rare-earth bonded magnet of the present invention is manufactured, by way of example, as follows.

The manufacturing method primarily comprises the following steps.

<1> Preparation of Rare-earth Bonded Magnet Composition

The rare-earth bonded magnet composition is prepared by employing the above-described rare-earth magnetic powder and the above-described binding resin, or by further employing the above-described antioxidant, lubricant, etc. in addition to them.

Those composition ingredients are mixed, as needed, by a mixer, e.g., a Henschel mixer, or an agitator.

<2> Kneading

The rare-earth bonded magnet composition is subjected to kneading. In the kneading step, the magnetic powder is pulverized, the magnetic powder, the binding resin and other ingredients are further mixed, and a resin layer is coated over the powder surface. The kneading is sufficiently performed, for example, with a kneader or the like that is separate from or associated with a molding machine. The kneader is not particularly limited, but may be of the batch or continuous type so long as it can provide the desired temperature and satisfactory kneading.

The mixture is kneaded at a temperature at which the used binding resin is at least softened or molten, preferably at a temperature at which it is molten. Specifically, the kneading temperature is preferably about 250–370° C., more preferably about 270–330° C. By kneading the mixture at such a temperature, the kneading effect is enhanced and the kneading can be finished more evenly in a shorter time than the case of kneading the mixture at the normal temperature. Further, because the kneading is performed at a reduced viscosity of the binding resin, the mixture is brought into a condition where the binding resin covers around the rare-earth magnetic powder, and this condition contributes to reducing the porosity in the rare-earth bonded magnet composition and the bonded magnet manufactured from the composition.

The average residing time of the kneaded mixture is preferably about 1–30 minutes, more preferably about 2–20 minutes. Here, the average residing time of the kneaded mixture means a value resulted from dividing the amount of the kneaded mixture residing in the kneader by the average flow rate of the kneaded mixture. If the average residing time is too short, the kneading would be insufficient, and if the average residing time is too long, oxidation, deterioration and denaturation of the kneaded mixture would be progressed along with mechanical damage, and a high density could not be obtained in the molding, thus resulting in no improvement of the magnetic characteristics.

The kneading may be performed in the open air, but preferably performed under a vacuum or depressurized state (e.g., 1 Pa–0.1 MPa), or in a non-oxidizing atmosphere such as inert gas like nitrogen gas or argon gas <3> Cooling of Kneaded Mixture After the kneading, the kneaded mixture is preferably cooled down to about the normal temperature. The cooling is preferably performed in continuation with the kneading. With the cooling, the binding resin layer formed on the surface of the magnetic powder in the kneading step is fixedly solidified to make surer the kneading effect.

The cooling rate in the step of cooling the kneaded mixture depends on the atmosphere, and it may be relatively low in the non-oxidizing atmosphere. However, the kneaded mixture is preferably cooled as fast as possible so that the binding resin coated over the surface of the magnetic powder is quickly solidified. The cooling rate is not particularly limited, but it is preferably not less than 10° C./sec, more preferably not less than 50° C./sec. If the cooling rate is too low, oxidation and deterioration of the kneaded mixture or outflow of the resin layer on the magnetic powder surface would occur, thus resulting in reduction of the kneading effect.

<4> Granulating

The obtained kneaded mixture is granulated or evenly granulated to produce granules having a predetermined grain size. With this step, particularly in the compaction molding, the molding materials can be easily and surely filled in a mold, and the precision in quantity of the filled materials is improved. Consequently, the dimensional accuracy of the resulting bonded magnet is increased.

The method of performing granulation or even granulation is not particularly limited. For example, the kneaded mixture is pulverized into granules, or the kneaded mixture is directly introduced to a granulating machine, such as a thrust granulating machine, and then cooled. The pulverization is performed by, for example, a ball mill, a vibratory mill, a pulverizer, a jet mill, or a pin mill. As an alternative, both a granulating machine and a pulverizer may be used in a combined manner.

Further, the grain size of the granules can be adjusted through classification using a sieve or the like.

The average grain size of the granules is preferably about 10 μm–3 mm, more preferably about 20 μm–1 mm, still more preferably about 50 μm–200 μm. If the grain size of the granules is larger than 3 mm, the amount of the granules filled in the mold would be difficult to finely adjust and the precision in quantity of the filled granules would be deteriorated, particularly when the size of the molded magnet is small, i.e., when the gap size of the mold is small. Accordingly, the dimensional accuracy of the resulting bonded magnet could not be increased. On the other hand, if the average grain size of the granules is smaller than 10 μm, such granules may be difficult or troublesome to fabricate (granulate). Further, the too small average grain size would show tendency to raise a difficulty in filling the granules in the mold and to increase the porosity of the resulting bonded magnet.

The grain size of the granules may be even or varied to some extent.

<5> Molding to Bonded Magnet

The molding method may be any of compaction molding, extrusion molding, injection molding, etc. The methods using compaction molding, extrusion molding, and injection molding will be described below by way of typical examples.

<5.1> Compaction Molding

The desired amount of the rare-earth bonded magnet composition is filled in a mold of a compaction molding machine, and then subjected to compaction molding under a magnetic field (orientation magnetic field is, e.g., 5–20 kOe and orientation direction may be vertical, horizontal or radial) or under no magnetic field.

The compaction molding is performed, for example, as hot molding. In other words, the molding is carried out by heating the mold such that the material temperature in the molding step becomes not lower than the softening temperature of the binding resin employed. Specifically, the material temperature in the molding step is set to be preferably about 250–370° C., more preferably about 270–330° C.

The heating method is not particularly limited, and may be performed with burner heating, electrical resistance heating, high-frequency heating, infrared irradiation, plasma irradiation, or the like. A suitable one of these methods is selected depending on the molding machine.

With the hot molding described above, the fluidity of the molding material in the mold is improved and the bonded magnet can be molded with good dimensional accuracy under a lower molding pressure. Specifically, the bonded magnet can be molded (shaped) under a molding pressure preferably not higher than 500 MPa, more preferably not higher than 350 MPa. Thus, the molding is facilitated, and bonded magnets in the forms having thin portions such as a ring, flat plate and curved plate, including a long one, can be mass-produced with good and stable shapes and dimensions.

Further, with the hot molding, the porosity of the resulting magnet can be reduced even under the low molding pressure described above.

Moreover, in the molding under a magnetic field, the hot molding is effective to increase the fluidity of the molding materials in the mold, facilitate rotation of the magnetic powder under the external magnetic field, and improve magnetic orientation. In addition, the coercive force of the rare-earth magnetic powder is reduced due to a temperature rise, which is equivalent to the fact that an apparently high magnetic field is applied. As a result, the rare-earth magnetic powder is more easily oriented in the desired direction and the magnetic characteristics can be improved.

The molding thus molded is released from the mold after being cooled, whereby the rare-earth bonded magnet of the present invention is obtained.

<5.2> Extrusion Molding

The rare-earth bonded magnet composition is molten in a cylinder of an extrusion molding machine by being heated to a temperature not lower than the melting point of the binding resin. The molten composition is pushed out of a die of the extrusion molding machine under a magnetic field (orientation magnetic field is, e.g., 10–20 kOe) or under no magnetic field. The extrusion molding is performed as hot molding. The material temperature within the cylinder in the molding step is set to be preferably about 250–370° C., more preferably about 270–330° C. Also, the extruding rate is preferably about 0.1–10 mm/sec, and the mold temperature is preferably about 200–350° C.

The molding is cooled and solidified, for example, when the molten composition is pushed out of the die. Then, the pushed-out long molding is appropriately cut, whereby the rare-earth bonded magnet having the desired shape and dimensions is obtained.

The cross-sectional shape of the rare-earth bonded magnet is determined depending on which shape is selected for the die (comprising an inner die and an outer die) of the extrusion molding machine. Even rare-earth bonded magnets having thin portions and different sectional shapes can be easily manufactured. Furthermore, by adjusting the cut length of the molding, a long magnet can also be manufactured.

With the method described above, it is possible to manufacture the rare-earth bonded magnet which has a greater degree of freedom in magnet shape, which has superior fluidity, moldability and dimensional accuracy with a smaller amount of the binding resin, and which can be continuously manufactured to be suitable for mass production.

<5.3> Injection Molding

The rare-earth bonded magnet composition is molten in an injection cylinder of an injection molding machine by being heated to a temperature not lower than the melting point of the binding resin. The molten composition is injected into a mold of the injection molding machine under a magnetic field (orientation magnetic field is, e.g., 6–18 kOe) or under no magnetic field. The injection molding is performed as hot molding. The material temperature within the cylinder in the molding step is set to be preferably about 250–370° C., more preferably about 270–330° C. Also, the injection pressure is preferably about 30–100 $kgf/cm^2$, and the mold temperature is preferably about 70–120° C.

Then, the molding is cooled and solidified, whereby the rare-earth bonded magnet having the desired shape and dimensions is obtained. At this time, the cooling time is preferably about 5–30 seconds.

The shape of the rare-earth bonded magnet is determined by the mold shape of the injection molding machine. Depending on which shape is selected for a cavity of the mold, even rare-earth bonded magnets having thin portions and different sectional shapes can be easily manufactured.

With the method described above, it is possible to manufacture the rare-earth bonded magnet which has a still greater degree of freedom in magnet shape than the extrusion molding, which has superior fluidity, moldability and dimensional accuracy with a smaller amount of the binding resin, and which can be manufactured in a shorter molding time to be suitable for mass production.

As a matter of course, in the method of manufacturing the rare-earth bonded magnet of the present invention, the kneading conditions, the molding conditions, etc. are not limited to the above-described ranges.

[Embodiments]

EXAMPLES 1–10

Five kinds of rare-earth magnetic powder (or magnetic powder) having the following compositions ①, ②, ③, ④ and ⑤, three kinds of binding resins A, B and C given below, two kinds of antioxidants a and b given below, and two kinds of lubricants and II given below were prepared. These ingredients were mixed in predetermined combinations listed in Table 1 given below.

Also, the amounts of the magnetic powder, binding resin, antioxidant, etc. in each mixture (composition) are as shown in Table 1.

Rare-earth Magnetic Powder

① rapidly cooled $Nd_{11}Pr_1Fe_{bal}Co_5B_6$ powder (average particle size=18 μm)

② rapidly cooled $Nd_{12}Fe_{bal}Co_3Nb_2B_6$ powder (average particle size=20 μm)

③ $Sm(Co_{0.604}Cu_{0.06}Feo_{0.82}Zr_{0.018})_{8.3}$ powder (average particle size=10 μm)

④ $Sm_2Fe_{17}N_3$ powder (average particle size=3 μm)

⑤ anisotropic $Nd_{18}Fe_{bal}Co_{11}Ga_1B_8$ powder according to the HDDR process (average particle size=10 μm)

Binding Resin $$-(X-R-X-Y-Ar-Y)-$$

A. 100 wt % of a high molecular compound comprising a structure unit expressed by the above formula (where X: NH group, Y: CO group, R: $(CH_2)_9$, and Ar: p-phenylene group); (melting point: about 308° C.)

B. 100 wt % of a high molecular compound comprising a copolymer of 90 mol % of a first structure unit expressed by the above formula (where X: NH group, Y: CO group, R: $(CH_2)_9$, and Ar: p-phenylene group) and 10 mol % of a second structure unit expressed by the above formula (where X: NH group, Y: CO group, R: $CH_2CHCH_3(CH_2)_6$, and Ar: p-phenylene group); (melting point: about 307° C.)

C. a polymer blend of 95 wt % of {a high molecular compound comprising a first structure unit expressed by the above formula (where X: NH group, Y: CO group, R: $(CH_2)_9$, and Ar: p-phenylene group)}, and 5 wt % of {a high molecular compound comprising a copolymer of 70 mol % of a third structure unit expressed by the above formula (where X: NH group, Y: CO group, R: $(CH_2)_6$, and Ar: p-phenylene group) and 30 mol % of polyamide 66 (melting point: about 310° C.)

Antioxide a. hydrazine compound (Ciba-Geigy Japan Limited, Trade Name: Irganox MD1024)

b. tocopherol

Lubricant

I. stearic acid

II. zinc stearate

Subsequently, such a mixture was sufficiently kneaded using a screw-type 2-axis thrust kneader (unidirectional rotation, ϕ15) and the cooled down to about the normal temperature, whereby the rare-earth bonded magnet composition (kneaded mixture or compound) was obtained. The kneading conditions and the cooling condition (cooling rate) in those steps were set as listed in Table 2.

Then, the kneaded mixture was pulverized by a pulverizer (or a disintegrator) into granules having the average grain size of about 200 μm. The granules were filled in a mold after weighing, and subjected to hot compaction molding by a pressing machine, whereby a rare-earth bonded magnet was obtained. The molding conditions in that step were as listed in Table 2. In the molding under a magnetic field, a vertical magnetic field was applied in the same direction as that in which the bonded magnet was pressed. Incidentally, the average residing time was determined by dividing the amount of the kneaded mixture in the kneader by the flow rate per unit time.

The obtained bonded magnet had a columnar shape and dimensions (design dimensions) of 10-mm outer diameter and 7-mm height.

Comparative Examples 1, 2

As Comparative Example 1, a mixture was prepared using a binding resin comprising 100 wt % of polyamide 66 (melting point: about 255° C.) and other ingredients listed in Table 1. Then, in a like manner to the above Examples, a kneaded mixture was obtained (see Table 2 for the kneading conditions, etc.) and subjected to hot compaction molding under the conditions listed in Table 2, whereby a rare-earth bonded magnet was obtained.

As Comparative Example 2, a mixture was prepared using a binding resin comprising 100 wt % of polyamide 12 (melting point: about 180° C.) and other ingredients listed in Table 1. Then, in a like manner to the above Examples, a kneaded mixture was obtained (see Table 2 for the kneading conditions, etc.) and subjected to hot compaction molding under the conditions listed in Table 2, whereby a rare-earth bonded magnet was obtained.

EXAMPLES 11–20

Rare-earth magnetic powder (or magnetic powder), binding resins, antioxidants, and lubricants were prepared and mixed in predetermined combinations listed in Table 3 given below (see the above Examples for details of the ingredients).

Then, a kneaded mixture was obtained in a like manner to the above Examples (see Table 4 for the kneading conditions, etc.) and subjected to extrusion molding (extruding rate: 3 mm/sec) under the conditions listed in Table 4, whereby a rare-earth bonded magnet was obtained.

The obtained bonded magnet had a cylindrical shape and dimensions (design dimensions) of 18-mm outer diameter, 0.7-mm wall thickness and 8-mm height.

Comparative Examples 3, 4

As Comparative Example 3, a mixture was prepared using a binding resin comprising 100 wt % of polyamide 66 and other ingredients listed in Table 3. Then, in a like manner to the above Examples, a kneaded mixture was obtained (see Table 4 for the kneading conditions, etc.) and subjected to extrusion molding under the conditions listed in Table 4, whereby a rare-earth bonded magnet was obtained.

As Comparative Example 4, a mixture was prepared using a binding resin comprising 100 wt % of polyamide 12 and other ingredients listed in Table 3. Then, in a like manner to the above Examples, a kneaded mixture was obtained (see Table 4 for the kneading conditions, etc.) and subjected to extrusion molding under the conditions listed in Table 4, whereby a rare-earth bonded magnet was obtained.

EXAMPLES 21–30

Rare-earth magnetic powder (or magnetic powder), binding resins, antioxidants, and lubricants were prepared and mixed in predetermined combinations listed in Table 5 given below (see the above Examples for details of the ingredients).

Then, a kneaded mixture was obtained in a like manner to the above Examples (see Table 6 for the kneading conditions, etc.) and subjected to injection molding under the conditions listed in Table 6, whereby a rare-earth bonded magnet was obtained.

The obtained bonded magnet had a cylindrical shape and dimensions (design dimensions) of 20-mm outer diameter, 1.0-mm wall thickness and 10-mm height.

Comparative Examples 5, 6

As Comparative Example 5, a mixture was prepared using a binding resin comprising 100 wt % of polyamide 66 and other ingredients listed in Table 5. Then, in a like manner to the above Examples, a kneaded mixture was obtained (see Table 6 for the kneading conditions, etc.) and subjected to injection molding under the conditions listed in Table 6, whereby a rare-earth bonded magnet was obtained.

As Comparative Example 6, a mixture was prepared using a binding resin comprising 100 wt % of polyamide 12 and other ingredients listed in Table 5. Then, in a like manner to the above Examples, a kneaded mixture was obtained (see Table 6 for the kneading conditions, etc.) and subjected to injection molding under the conditions listed in Table 6, whereby a rare-earth bonded magnet was obtained.

(Evaluation)

The compositions and various characteristics of the bonded magnets of Examples 1–30 and Comparative Examples 1–6 are listed in Tables 7–9 given below. The various characteristics in Tables were evaluated as follows.

Maximum Magnetic Energy Product

The maximum magnetic energy product $(BH)_{max}$ was determined by magneti zing the bonded magnet in the direction of height thereof, and measuring a BH curve with DC Recording Fluxmeter made by Toei Mfg. Co., Ltd.

Density

The density was measured in accordance with the underwater Archimedes method.

Porosity

The Porosity was determined with the following calculation formula based on a difference between a density, which is calculated from the density of each ingredient and the mixing ratio thereof, and an actual density measured as described above:

porosity=1−(actual density/calculated density)

Mechanical Strength

The mechanical strength was evaluated by cutting a specimen of 3-mm height from the obtained bonded magnet, and subjecting the specimen to shear stamping (in conformity with Standard EMAS7006 of Japan Electronic Material Association).

Heat Resistance

The heat resistance was evaluated by magnetizing the obtained rare-earth bonded magnet, bringing it into a high-temperature condition (180° C. for 100 hours), and then measuring changes in total flux (irreversible demagnetizing factor) before and after the test, as well as changes in dimensions, i.e., outer diameter and height. The measured changes were rated in four stages ◎, ○, Δ and x from the smallest as a whole.

Shape Stability

The shape stability was evaluated by bringing the obtained rare-earth bondedmagnet into a high-temperature, high-moisture environment (80° C., 90%RH) for 100 hours, and then measuring rates of changes in dimensions, i.e., outer diameter and height (10-point measurement). The measured changes were rated in four stages ◎, ○, Δ and x from the smallest.

Corrosion Resistance

The corrosion resistance was evaluated by conducting an acceleration test on the obtained rare-earth bonded magnet under conditions of 60° C. and 95%RH using a thermo-hygrostatic chamber, and then measuring a period of time until the occurrence of rust. The measured period of time was rated in four stages ◎, ○, Δ and x from the longest.

As seen from Tables 7–9, any of the rare-earth bonded magnets of Examples 1–30 had a low porosity, a high mechanical strength, and was superior in magnetic characteristics (maximum magnetic energy product), heat resistance, shape stability, and corrosion resistance. Then, any bonded magnet showed good moldability in spite of the small content of the binding resin.

Also, rare-earth bonded magnets having superior characteristics were obtained under a lower molding pressure in Examples 4 and 7–10 which were subjected to the compaction molding and contained the lubricant.

On the other hand, the rare-earth bonded magnets of Comparative Examples 1–6 were inferior in mechanical strength, heat resistance, shape stability, and corrosion resistance because of the specific properties of the binding resins used.

As described above, the present invention can provide a rare-earth bonded magnet which has superior moldability even with a smaller amount of a binding resin, which has good magnetic characteristics and a high mechanical strength, and which is superior in heat resistance, shape stability, and corrosion resistance.

Industrial Applicability

Since the rare-earth bonded magnet of the present invention has good magnetic characteristics and is superior in shape stability and heat resistance, it can be suitably used not only in ordinary applications, but also in devices and parts which are used under a high-temperature environment, as well as devices and parts (e.g., a high-torque, high-output motor) which generate heat and are brought into a high-temperature condition.

TABLE 1

| | Compaction molding | | | | | | | |
|---|---|---|---|---|---|---|---|---|
| Composition (wt %) | Magnetic powder | Amount of magnetic powder | Binding resin | Amount of resin | Antioxidant | Amount of antioxidant | Lubricant | Amount of lubricant |
| Example 1 | ① | 97.0 | A | 2.5 | a | 0.5 | — | — |
| Example 2 | ① | 96.0 | B | 2.9 | a | 1.1 | — | — |
| Example 3 | ① | 96.0 | C | 2.9 | a | 1.1 | — | — |
| Example 4 | ① | 96.0 | A | 2.9 | a | 1.0 | II | 0.1 |
| Example 5 | ② | 98.0 | A | 1.4 | b | 0.6 | — | — |
| Example 6 | ② | 96.0 | B | 3.5 | b | 0.5 | — | — |
| Example 7 | ② | 98.0 | A | 1.4 | b | 0.5 | I | 0.1 |
| Example 8 | ③ | 97.0 | A | 2.4 | b | 0.5 | II | 0.1 |
| Example 9 | ④ | 97.0 | A | 2.4 | a | 0.5 | I | 0.1 |
| Example 10 | ⑤ | 97.0 | A | 2.4 | a | 0.5 | I | 0.1 |
| Comparative example 1 | ① | 96.0 | PA66 | 2.9 | a | 1.1 | — | — |

TABLE 1-continued

| Composition (wt %) | Compaction molding | | | | | | | |
|---|---|---|---|---|---|---|---|---|
| | Magnetic powder | Amount of magnetic powder | Binding resin | Amount of resin | Antioxidant | Amount of antioxidant | Lubricant | Amount of lubricant |
| Comparative example 2 | ② | 96.0 | PA12 | 2.9 | a | 1.1 | — | — |

TABLE 2

| | Compaction molding | | | | | | |
|---|---|---|---|---|---|---|---|
| | Kneading conditions | | | | Molding conditions | | |
| | Kneading atmosphere | Kneading temperature (° C.) | Average residing time (min.) | Cooling conditions Cooling rate (° C./sec.) | Material temperature in mold (° C.) | Molding pressure (MPa) | Orientation magnetic field (kOe) |
| Example 1 | In nitrogen gas | 315 | 12 | 55 | 315 | 490 | No magnetic field |
| Example 2 | In argon gas | 315 | 15 | 53 | 315 | 490 | No magnetic field |
| Example 3 | In nitrogen gas | 315 | 12 | 55 | 315 | 490 | No magnetic field |
| Example 4 | In nitrogen gas | 310 | 13 | 54 | 310 | 195 | No magnetic field |
| Example 5 | In nitrogen gas | 315 | 15 | 55 | 315 | 490 | No magnetic field |
| Example 6 | In nitrogen gas | 315 | 14 | 54 | 315 | 490 | No magnetic field |
| Example 7 | In nitrogen gas | 310 | 15 | 55 | 310 | 195 | No magnetic field |
| Example 8 | In nitrogen gas | 315 | 15 | 55 | 315 | 195 | 15 |
| Example 9 | In nitrogen gas | 315 | 15 | 55 | 315 | 195 | 15 |
| Example 10 | In nitrogen gas | 315 | 15 | 55 | 315 | 195 | 15 |
| Comparative example 1 | In nitrogen gas | 270 | 15 | 55 | 270 | 490 | No magnetic field |
| Comparative example 2 | In nitrogen gas | 200 | 15 | 55 | 200 | 490 | No magnetic field |

TABLE 3

| Composition (wt %) | Extrusion molding | | | | | | | |
|---|---|---|---|---|---|---|---|---|
| | Magnetic powder | Amount of magnetic powder | Binding resin | Amount of resin | Antioxidant | Amount of antioxidant | Lubricant | Amount of lubricant |
| Example 11 | ① | 96.0 | A | 3.5 | a | 0.5 | — | — |
| Example 12 | ① | 95.0 | B | 3.9 | a | 1.1 | — | — |
| Example 13 | ① | 95.0 | C | 3.9 | a | 1.1 | — | — |
| Example 14 | ① | 95.0 | A | 3.9 | a | 1.0 | II | 0.1 |
| Example 15 | ② | 97.0 | A | 2.4 | b | 0.6 | — | — |
| Example 16 | ② | 95.0 | B | 4.5 | b | 0.5 | — | — |
| Example 17 | ② | 97.0 | A | 2.4 | b | 0.5 | I | 0.1 |
| Example 18 | ③ | 96.0 | A | 3.4 | b | 0.5 | II | 0.1 |
| Example 19 | ④ | 96.0 | A | 3.4 | a | 0.5 | I | 0.1 |
| Example 20 | ⑤ | 96.0 | A | 3.4 | a | 0.5 | I | 0.1 |
| Comparative example 3 | ① | 95.0 | PA66 | 3.9 | a | 1.1 | — | — |
| Comparative example 4 | ② | 95.0 | PA12 | 3.9 | a | 1.1 | — | — |

TABLE 4

| | Extrusion molding | | | | | | |
|---|---|---|---|---|---|---|---|
| | Kneading conditions | | | | Molding conditions | | |
| | Kneading atmosphere | Cooling rate (° C./sec.) | Average residing time (min.) | Cooling conditions Cooling rate (° C./sec.) | Material temperature in cylinder (° C.) | Die temperature (° C.) | Orientation magnetic field (kOe) |
| Example 11 | In nitrogen gas | 315 | 12 | 55 | 315 | 325 | No magnetic field |
| Example 12 | In argon gas | 315 | 15 | 53 | 315 | 325 | No magnetic field |

TABLE 4-continued

| | Extrusion molding | | | | | | |
|---|---|---|---|---|---|---|---|
| | Kneading conditions | | | Cooling | Molding conditions | | |
| | Kneading atmosphere | Cooling rate (° C./sec.) | Average residing time (min.) | conditions Cooling rate (° C./sec.) | Material temperature in cylinder (° C.) | Die temperature (° C.) | Orientation magnetic field (kOe) |
| Example 13 | In nitrogen gas | 315 | 12 | 55 | 315 | 325 | No magnetic field |
| Example 14 | In nitrogen gas | 310 | 13 | 54 | 310 | 320 | No magnetic field |
| Example 15 | In nitrogen gas | 315 | 15 | 55 | 315 | 325 | No magnetic field |
| Example 16 | In nitrogen gas | 315 | 14 | 54 | 315 | 325 | No magnetic field |
| Example 17 | In nitrogen gas | 310 | 15 | 55 | 310 | 320 | No magnetic field |
| Example 18 | In nitrogen gas | 315 | 15 | 55 | 315 | 325 | 15 |
| Example 19 | In nitrogen gas | 315 | 15 | 55 | 315 | 325 | 15 |
| Example 20 | In nitrogen gas | 315 | 15 | 55 | 315 | 325 | 15 |
| Comparative example 3 | In nitrogen gas | 270 | 15 | 55 | 270 | 280 | No magnetic field |
| Comparative example 4 | In nitrogen gas | 200 | 15 | 55 | 200 | 210 | No magnetic field |

TABLE 4

| | Injection molding | | | | | | | |
|---|---|---|---|---|---|---|---|---|
| Composition (wt %) | Magnetic powder | Amount of magnetic powder | Binding resin | Amount of resin | Antioxidant | Amount of antioxidant | Lubricant | Amount of lubricant |
| Example 21 | ① | 94.5 | A | 5.0 | a | 0.5 | — | — |
| Example 22 | ① | 93.5 | B | 5.4 | a | 1.1 | — | — |
| Example 23 | ① | 93.0 | C | 5.9 | a | 1.1 | — | — |
| Example 24 | ① | 93.0 | A | 5.9 | a | 1.0 | II | 0.1 |
| Example 25 | ② | 95.5 | A | 3.9 | b | 0.6 | — | — |
| Example 26 | ② | 93.5 | B | 6.0 | b | 0.5 | — | — |
| Example 27 | ② | 95.5 | A | 3.9 | b | 0.5 | I | 0.1 |
| Example 28 | ③ | 94.5 | A | 4.9 | b | 0.5 | II | 0.1 |
| Example 29 | ④ | 94.5 | A | 4.9 | a | 0.5 | I | 0.1 |
| Example 30 | ⑤ | 94.5 | A | 4.9 | a | 0.5 | I | 0.1 |
| Comparative example 5 | ① | 93.5 | PA66 | 4.4 | a | 1.1 | — | — |
| Comparative example 6 | ② | 93.5 | PA12 | 4.4 | a | 1.1 | — | — |

TABLE 6

| | Injection molding | | | | | | | |
|---|---|---|---|---|---|---|---|---|
| | Kneading conditions | | | | Molding conditions | | | |
| | Kneading atmosphere | Kneading temperature (° C.) | Average residing time (min.) | Cooling conditions Cooling rate (° C./sec) | Material temperature in cylinder (° C.) | Injection pressure ($kgf/cm^2$) | Mold temperature (° C.) | Orientation magnetic field (kOe) |
| Example 21 | In nitrogen gas | 315 | 12 | 55 | 315 | 60 | 100 | No magnetic field |
| Example 22 | In argon gas | 315 | 15 | 53 | 315 | 60 | 100 | No magnetic field |
| Example 23 | In nitrogen gas | 315 | 12 | 55 | 315 | 60 | 100 | No magnetic field |
| Example 24 | In nitrogen gas | 310 | 13 | 54 | 310 | 60 | 100 | No magnetic field |
| Example 25 | In nitrogen gas | 315 | 15 | 55 | 315 | 70 | 100 | No magnetic field |
| Example 26 | In nitrogen gas | 315 | 14 | 54 | 315 | 60 | 100 | No magnetic field |
| Example 27 | In nitrogen gas | 310 | 15 | 55 | 310 | 70 | 100 | No magnetic field |
| Example 28 | In nitrogen gas | 315 | 15 | 55 | 315 | 60 | 100 | 15 |
| Example 29 | In nitrogen gas | 315 | 15 | 55 | 315 | 60 | 100 | 15 |
| Example 30 | In nitrogen gas | 315 | 15 | 55 | 315 | 60 | 100 | 15 |
| Comparative example 5 | In nitrogen gas | 270 | 15 | 55 | 270 | 60 | 90 | No magnetic field |
| Comparative example 6 | In nitrogen gas | 200 | 15 | 55 | 200 | 60 | 90 | No magnetic field |

TABLE 7

| Composition (wt %) | Magnetic powder | Amount of magnetic powder | Antioxidant | Amount of antioxidant | Lubricant | Amount of lubricant | Maximum magnetic energy product (MGOe) | Density (g/cm$^3$) | Porosity (%) | Mechanical strength (MPa) | Heat resistance | Shape stability | Corrosion resistance |
|---|---|---|---|---|---|---|---|---|---|---|---|---|---|
| | | | | | | | Various characteristics | | | | | | |
| Example 1 | ① | 97.1 | a | 0.4 | — | — | 10.1 | 6.26 | 1.4 | 6.4 | ○ | ◎ | ◎ |
| Example 2 | ① | 96.2 | a | 0.9 | — | — | 8.8 | 6.07 | 1.3 | 7.0 | ○ | ◎ | ◎ |
| Example 3 | ① | 96.2 | a | 0.9 | — | — | 8.7 | 6.07 | 1.3 | 6.9 | ○ | ◎ | ◎ |
| Example 4 | ① | 96.1 | a | 0.9 | II | 0.05 | 8.0 | 6.03 | 1.1 | 5.3 | ○ | ◎ | ◎ |
| Example 5 | ② | 98.1 | b | 0.5 | — | — | 10.9 | 6.61 | 1.4 | 5.8 | ○ | ◎ | ◎ |
| Example 6 | ② | 96.1 | b | 0.4 | — | — | 9.1 | 5.99 | 1.3 | 7.1 | ○ | ◎ | ◎ |
| Example 7 | ② | 98.1 | b | 0.4 | I | 0.05 | 11.0 | 6.64 | 1.1 | 3.1 | ○ | ◎ | ◎ |
| Example 8 | ③ | 97.1 | b | 0.4 | II | 0.05 | 17.4 | 7.55 | 1.2 | 3.8 | ◎ | ◎ | ◎ |
| Example 9 | ④ | 97.1 | a | 0.4 | I | 0.05 | 17.8 | 6.38 | 1.1 | 3.6 | ◎ | ◎ | ◎ |
| Example 10 | ⑤ | 97.1 | a | 0.4 | I | 0.05 | 10.0 | 6.25 | 1.1 | 3.1 | ○ | ◎ | ◎ |
| Comparative example 1 | ① | 96.2 | a | 0.9 | — | — | 9.0 | 6.07 | 1.3 | 3.5 | Δ | x | ○ |
| Comparative example 2 | ② | 96.2 | a | 0.9 | — | — | 9.0 | 6.07 | 1.3 | 3.2 | x | Δ | ○ |

TABLE 8

| Composition (wt %) | Magnetic powder | Amount of magnetic powder | Antioxidant | Amount of antioxidant | Lubricant | Amount of lubricant | Maximum magnetic energy product (MGOe) | Density (g/cm$^3$) | Porosity (%) | Mechanical strength (MPa) | Heat resistance | Shape stability | Corrosion resistance |
|---|---|---|---|---|---|---|---|---|---|---|---|---|---|
| | | | | | | | Various characteristics | | | | | | |
| Example 11 | ① | 96.1 | a | 0.4 | — | — | 8.6 | 6.01 | 1.3 | 7.1 | ○ | ◎ | ◎ |
| Example 12 | ① | 95.2 | a | 0.9 | — | — | 8.5 | 5.76 | 1.3 | 7.4 | ○ | ◎ | ◎ |
| Example 13 | ① | 95.2 | a | 0.9 | — | — | 8.4 | 5.76 | 1.3 | 7.2 | ○ | ◎ | ◎ |
| Example 14 | ① | 95.2 | a | 0.8 | II | 0.05 | 8.2 | 5.80 | 1.2 | 6.4 | ○ | ◎ | ◎ |
| Example 15 | ② | 97.1 | b | 0.5 | — | — | 10.0 | 6.30 | 1.4 | 6.7 | ○ | ◎ | ◎ |
| Example 16 | ② | 95.1 | b | 0.4 | — | — | 8.5 | 5.76 | 1.3 | 7.3 | ○ | ◎ | ◎ |
| Example 17 | ② | 97.1 | b | 0.4 | I | 0.05 | 10.1 | 6.32 | 1.1 | 4.5 | ○ | ◎ | ◎ |
| Example 18 | ③ | 96.1 | b | 0.4 | II | 0.05 | 16.1 | 7.26 | 1.2 | 5.3 | ◎ | ◎ | ◎ |
| Example 19 | ④ | 96.1 | a | 0.4 | I | 0.05 | 16.6 | 6.13 | 1.2 | 5.1 | ◎ | ◎ | ◎ |
| Example 20 | ⑤ | 96.1 | a | 0.4 | I | 0.05 | 9.3 | 6.00 | 1.1 | 7.0 | ○ | ◎ | ◎ |
| Comparative example 3 | ① | 95.2 | b | 0.9 | — | — | 8.5 | 5.78 | 1.3 | 3.7 | Δ | x | ○ |
| Comparative example 4 | ② | 95.2 | b | 0.9 | I | 0.1 | 8.5 | 5.78 | 1.3 | 3.4 | x | Δ | ○ |

TABLE 9

| Composition (wt %) | Magnetic powder | Amount of magnetic powder | Antioxidant | Amount of antioxidant | Lubricant | Amount of lubricant | Maximum magnetic energy product (MGOe) | Density (g/cm$^3$) | Porosity (%) | Mechanical strength (MPa) | Heat resistance | Shape stability | Corrosion resistance |
|---|---|---|---|---|---|---|---|---|---|---|---|---|---|
| | | | | | | | Various Characteristics | | | | | | |
| Example 21 | ① | 94.6 | a | 0.4 | — | — | 7.5 | 5.57 | 1.2 | 7.8 | ○ | ◎ | ◎ |
| Example 22 | ① | 93.7 | a | 0.9 | — | — | 7.0 | 5.39 | 1.2 | 8.1 | ○ | ◎ | ◎ |
| Example 23 | ① | 93.2 | a | 0.9 | — | — | 6.7 | 5.26 | 1.2 | 8.3 | ○ | ◎ | ◎ |
| Example 24 | ① | 93.2 | a | 0.8 | II | 0.05 | 6.8 | 5.30 | 1.1 | 6.4 | ○ | ◎ | ◎ |
| Example 25 | ② | 95.6 | b | 0.5 | — | — | 8.6 | 5.81 | 1.3 | 7.3 | ○ | ◎ | ◎ |
| Example 26 | ② | 93.6 | b | 0.4 | — | — | 7.5 | 5.37 | 1.2 | 8.2 | ○ | ◎ | ◎ |
| Example 27 | ② | 95.6 | b | 0.4 | I | 0.05 | 7.7 | 5.41 | 1.1 | 6.3 | ○ | ◎ | ◎ |
| Example 28 | ③ | 94.6 | b | 0.4 | II | 0.05 | 14.0 | 6.73 | 1.1 | 5.9 | ◎ | ◎ | ◎ |
| Example 29 | ④ | 94.6 | a | 0.4 | I | 0.05 | 14.4 | 5.68 | 1.1 | 6.1 | ◎ | ◎ | ◎ |
| Example 30 | ⑤ | 94.6 | a | 0.4 | I | 0.05 | 8.1 | 5.56 | 1.1 | 6.1 | ○ | ◎ | ◎ |
| Comparative example 5 | ① | 93.7 | b | 0.9 | — | — | 6.9 | 5.39 | 1.2 | 4.1 | Δ | x | ○ |

TABLE 9-continued

| Composition (wt %) | Magnetic powder | Amount of magnetic powder | Antioxidant | Amount of antioxidant | Lubricant | Amount of lubricant | Maximum magnetic energy product (MGOe) | Density ($g/cm^3$) | Porosity (%) | Mechanical strength (MPa) | Heat resistance | Shape stability | Corrosion resistance |
|---|---|---|---|---|---|---|---|---|---|---|---|---|---|
| | Various Characteristics | | | | | | | | | | | | |
| Comparative example 6 | ② | 93.7 | b | 0.9 | 1 | 0.1 | 7.7 | 5.38 | 1.2 | 3.5 | x | Δ | ○ |

What is claimed is:

1. A rare earth bonded magnet in which magnetic powder containing a rare-earth element is bonded together by a binding resin, wherein said binding resin contains two or more high molecular compounds comprising the following structure unit;

—X—R—X—Y—Ar—Y— wherein X is a functional group containing a nitrogen atom, Y is a functional group containing a carbonyl group, R is a normal-chain or branched alkylene group having a carbon number of 6–16, and Ar is an aromatic ring residue; and wherein said binding resin has a melting point of 260–370° C.

2. A rare-earth bonded magnet according to claim 1, wherein the content of said magnet powder is 77–99.5 wt %.

3. A rare-earth bonded magnet according to claim 1, wherein porosity is not more than 5 vol %.

4. A rare-earth bonded magnet according to claim 1, wherein the magnetic energy product $(BH)_{max}$ resulted when said bonded magnet is molded under no magnetic field is not less than 2 MGOe.

5. A rare-earth bonded magnet according to claim 1, wherein the magnetic energy product $(BH)_{max}$ resulted when said bonded magnet is molded under a magnetic field is not less than 10 MGOe.

6. A rare-earth bonded magnet in which magnetic powder containing a rare-earth element is bonded together by a binding resin, wherein said binding resin contains two or more high molecular compounds comprising the following structure unit;

—X—R—X—Y—Ar—Y— wherein X is a functional group containing a nitrogen atom, Y is a functional group containing a carbonyl group, R is a normal-chain or branched alkylene group having a carbon number of 9–16, and Ar is an aromatic ring residue; and wherein said binding resin has a melting point of 260–370° C.

7. A rare earth bonded magnet composition comprising magnetic powder containing rare earth element, and a binding resin, wherein said binding resin contains two or more high molecular compounds comprising the following structure unit;

—X—R—X—Y—Ar—Y— wherein X is a functional group containing a nitrogen atom, Y is a functional group containing a carbonyl group, R is a normal-chain or branched alkylene group having a carbon number of 6–16, and Ar is an aromatic ring residue; and wherein said binding resin has a melting point of 260–370° C.

8. A rare earth bonded magnet composition according to claim 7, wherein the content of said magnetic powder is 77–99.5 wt %.

9. A rare earth bonded magnet composition according to claim 7, further comprising an antioxidant and/or a lubricant.

10. A rare earth bonded magnet composition comprising magnetic powder containing rare earth element, and a binding resin, wherein said binding resin contains two or more high molecular compounds comprising the following structure unit;

X—R—X—Y—Ar—Y— wherein X is a functional group containing a nitrogen atom, Y is a functional group containing a carbonyl group, R is a normal-chain or branched alkylene group having a carbon number of 9–16, and Ar is an aromatic ring residue; and wherein said binding resin has a melting point of 260–370° C.

11. A rare earth bonded magnet composition according to claim 10, wherein the content of said magnetic powder is 77–99.5 wt %.

12. A rare earth bonded magnet composition according to claim 10, further comprising an antioxidant and/or a lubricant.

13. A method of manufacturing a rare-earth bonded magnet, said method comprising the steps of:

kneading a rare-earth bonded magnet composition according to any one of claims 7 to 9 at a temperature at which a binding resin in said composition is at least softened or molten, thereby obtaining a kneaded mixture; and molding said kneaded mixture into a magnet shape.

14. A method of manufacturing a rare-earth bonded magnet according to claim 13, wherein said kneaded mixture is molded by hot molding.

* * * * *